United States Patent
Chang

(10) Patent No.: US 7,336,176 B2
(45) Date of Patent: Feb. 26, 2008

(54) POSITION INDICATING SYSTEM

(75) Inventor: Yum-Cheng Chang, Taipei (TW)

(73) Assignee: Lite-On Technology Corp., Neihu, Taipei (TW)

( * ) Notice: Subject to any disclaimer, the term of this patent is extended or adjusted under 35 U.S.C. 154(b) by 200 days.

(21) Appl. No.: 11/163,985

(22) Filed: Nov. 7, 2005

(65) Prior Publication Data

US 2006/0290499 A1 Dec. 28, 2006

(30) Foreign Application Priority Data

Jun. 27, 2005 (TW) .............................. 94121455 A

(51) Int. Cl.
*G01S 1/00* (2006.01)
*H04B 7/185* (2006.01)
*G08B 13/14* (2006.01)

(52) U.S. Cl. .............................. 340/572.1; 342/357.06

(58) Field of Classification Search ................ 340/524, 340/525, 539.1, 539.11–539.25, 568.1–572.9, 340/870.11, 870.15, 988–996, 825.36–825.43, 340/825.49, 10.1–10.3; 701/207–224; 342/357.01–357.17; 455/456.1–457
See application file for complete search history.

(56) References Cited

U.S. PATENT DOCUMENTS

| | | | |
|---|---|---|---|
| 5,394,333 A * | 2/1995 | Kao | 701/217 |
| 5,646,616 A * | 7/1997 | Komatsu | 340/988 |
| 5,902,351 A * | 5/1999 | Streit et al. | 701/220 |
| 6,181,253 B1 * | 1/2001 | Eschenbach et al. | 340/825.37 |
| 6,597,987 B1 * | 7/2003 | Barton | 701/213 |
| 6,774,811 B2 * | 8/2004 | Kaufman et al. | 340/825.49 |
| 7,283,037 B2 * | 10/2007 | Diorio et al. | 340/10.51 |
| 2007/0252677 A1 * | 11/2007 | Hansen et al. | 340/10.3 |

* cited by examiner

*Primary Examiner*—Benjamin C. Lee
*Assistant Examiner*—Jennifer Mehmood
(74) *Attorney, Agent, or Firm*—Winston Hsu

(57) ABSTRACT

A position indicating system includes: a position indicating device, a first reference device, and a second reference device. The position indicating device includes: a first position indicating module for outputting a first signal; a second position indicating module for outputting a second signal; and a selecting module coupled to the first position indicating module and the second position indicating module for selectively driving the first position indicating module to output the first signal or driving the second position indicating module to output the second signal. The first reference device is corresponding to the first position indicating module for receiving the first signal and generating first position information according to a position of the position indicating device. And the second reference device is corresponding to the second position indicating module for receiving the second signal and generating second position information according to a position of the position indicating device.

17 Claims, 4 Drawing Sheets

POSITION INDICATING SYSTEM

BACKGROUND OF THE INVENTION

1. Field of the Invention

The invention relates to a position indicating system, and more particularly, to a position indicating system capable of generating position information to a position-requesting device.

2. Description of the Prior Art

In today's society, there are many problems involving missing persons. Senior citizens with Alzheimer's disease and young children are at particular risk of going missing. Once a person has gone missing, there is no way to find them or to trace their current location.

Recent developments in technology have given rise to the global positioning system (GPS). As known by those skilled in the art, GPS utilizes co-ordinates of a plurality of satellites (including the spatial co-ordinates and the current time of the satellites) to accurately calculate the position of a receiver. In other words, a user can know their exact location through GPS. Even with the development of this technology, however, there has been no solution for the above-mentioned problem.

SUMMARY OF THE INVENTION

It is therefore one of the primary objectives of the claimed invention to provide a position indicating system having a plurality of position indicating mechanisms to solve the above-mentioned problem.

According to an exemplary embodiment of the claimed invention, a position indicating system is disclosed. The position indicating system comprises: a position indicating device, a first reference device, and a second reference device. The position indicating device comprises: a first position indicating module for outputting a first signal; a second position indicating module for outputting a second signal; and a selecting module electrically connected to the first position indicating module and the second position indicating module for selectively driving the first position indicating module to output the first signal or driving the second position indicating module to output the second signal. The first reference device is corresponding to the first position indicating module and utilized for receiving the first signal and generating first position information according to a position of the position indicating device. In addition, the second reference device is corresponding to the second position indicating module and utilized for receiving the second signal and generating second position information according to a position of the position indicating device.

According to another exemplary embodiment of the claimed invention, a position indicating system is disclosed. The position indicating system comprises: a position indicating device, a first reference device, and a second reference device. The position indicating device comprises: a first position indicating module for outputting a first signal; a second position indicating module for receiving a second signal and generating second position information corresponding to a position of the position indicating device according to the second signal; and a selecting module electrically connected to the first position indicating module and the second position indicating module for selectively driving the first position indicating module to output the first signal or driving the second position indicating module to receiving the second signal. The first reference device is corresponding to the first position indicating module and utilized for receiving the first signal and generating first position information of the position indicating device according to the first signal. In addition, the second reference device is corresponding to the second position indicating module and utilized for outputting the second signal.

The present invention can accurately determine the current location of the position indicating device and transmit position information to an external position requesting device. Therefore, a first user only has to carry the position indicating device, and another user who has the position requesting device can know the current location of the first user. Thus, the problem of missing persons can be solved. In addition, the present invention position indicating system can simultaneously utilize the wireless network, GPS, and radio frequency identification (RFID) techniques to determine the position of the position indicating device. The present invention position indicating system can therefore be utilized in any location to accurately determine the location of the position indicating device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
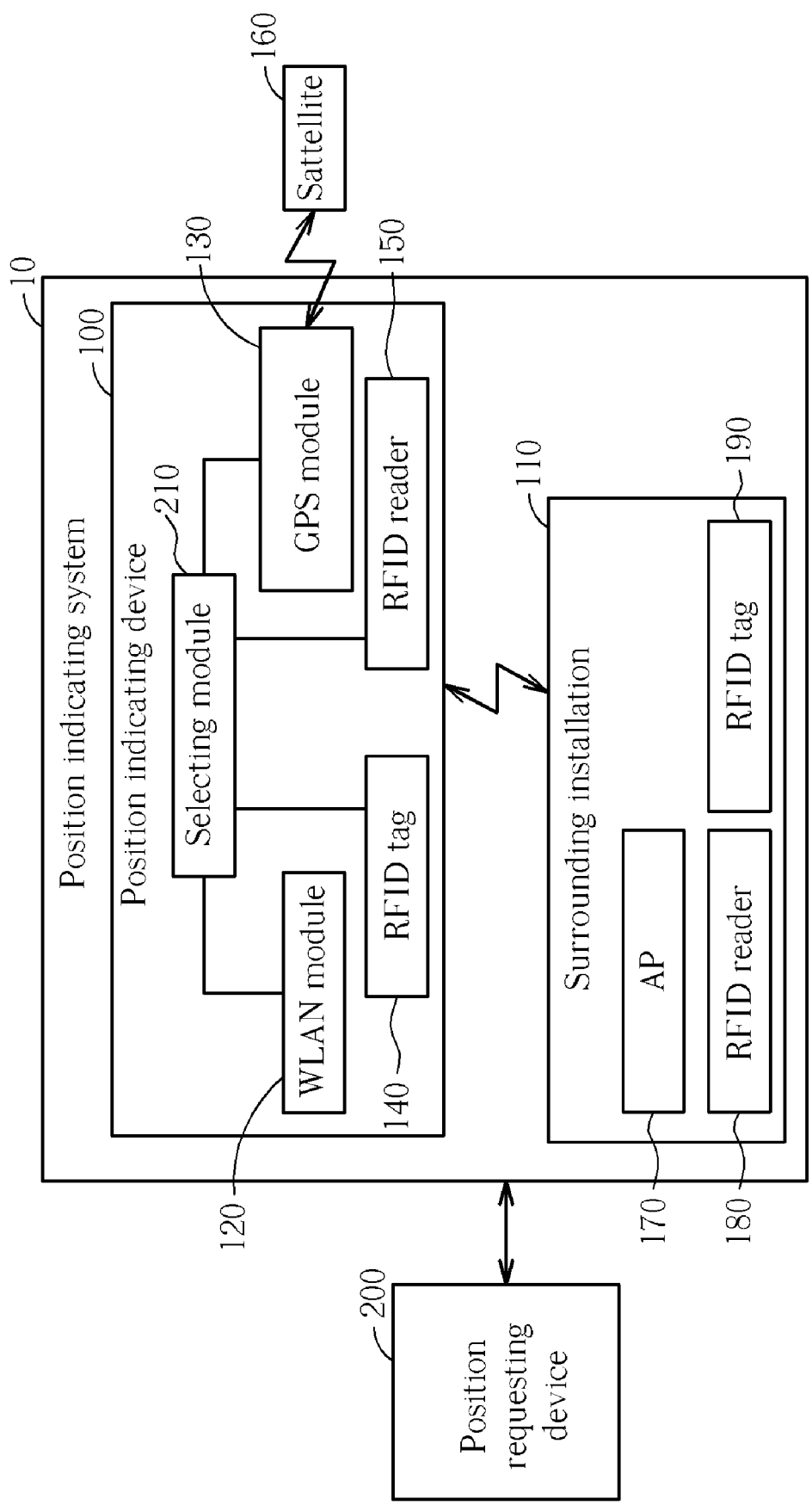
FIG. 1 is a diagram of a first embodiment of a position indicating system according to the present invention.

Please refer to FIG. 1, which is a schematic diagram of a first embodiment of a position indicating system 10 according to the present invention. As shown in FIG. 1, the position indicating system 10 comprises a position indicating device 100, and a surrounding installation 110. The position indicating device 100 comprises a selecting module 210 and a plurality of position indicating modules. For example, as shown in FIG. 1, the position indicating device 100 can comprise a wireless local area network (WLAN) module 120, a global positioning system (GPS) module 130, a radio frequency identification (RFID) tag 140, and a radio frequency identification (RFID) reader 150. In addition, the surrounding installations 110 comprise a plurality of reference devices corresponding to the position indicating modules of the position indicating device. In this embodiment, the surrounding installations 110 comprises an access point (AP) 170 corresponding to the WLAN module 120, an RFID reader 180 corresponding to the RFID tag 140, and an RFID tag 190 corresponding to the RFID reader 150. The function and the communication mechanism of the AP 170 and the WLAN module 120 and the function and the communication mechanism of the RFID tags 140 and 190 and the RFID readers 180 and 150 are well known by those skilled in the art, and thus omitted here. Furthermore, the GPS module 130 can communicate with a plurality of satellites 160. Theoretically, the GPS module 130 can calculate the current position of the position indicating device 100 according to the data transferred from the satellites 160. Please note that the related operations and the circuit designs of the GPS module 130 are also well known by those skilled in the art, and thus omitted here.

The functions and operations of the position indicating system 10 and the position indicating device 100 are illustrated as follows: first, an external position requesting device 200 transfers a position request to the position indicating device 100. After the position indicating device 100 receives the position request, the WLAN module 120, the GPS module 130, the RFID tag 140, and the RFID reader 150 are activated to search the surrounding installations 110 near the position indicating device 100 such that the position of the position indicating device 100 can be determined.

When the WLAN module is utilized in this embodiment, after the position indicating device 100 receives the position request, the WLAN module 120 determines whether an AP 170 is near the position indicating device 100. If there is an AP 170 near the position indicating device 100, the WLAN module 120 transfers a signal to the AP 170. After the AP 170 receives the signal, the AP 170 transfers position information to the above-mentioned position requesting device 200. The AP 170 can be a fixed-type AP, meaning that the AP 170 is always at a fixed position. Therefore, the AP 170 only has to transfer its IP address back such that the position of the position indicating device 100 can be traced.

For the GPS module 130, after the position indicating device 100 receives the position request, the GPS module 130 utilizes the above-mentioned satellites 160 to calculate the current position of the position indicating device 100, and then transfers position information of the position indicating device 100 back to the position requesting device 200.

When the RFID tag 140 is utilized, because the RFID reader 180 can identify the RFID 140 inside the position indicating device 100, the RFID reader 180 can be utilized to trace the position of the position indicating device 100 after the position indicating device 100 receives the position request. For example, after the RFID reader 180 identifies the RFID tag 140 inside the position indicating device 100, the RFID reader 180 only has to transfer a signal back to the position requesting device 200. Generally speaking, because the RFID reader 180 is also a fixed-type device, the position requesting device 200 can easily trace the current position of the position indicating device. Furthermore, because the effective distance that the RFID reader 180 can detect the RFID tag 140 is not long, if the position of the RFID reader 180 can be determined, this means that the current position of the position indicating device 100, which is detected by the RFID reader 180, can also be determined.

The function and operation of the RFID reader 150 are quite similar to the aforementioned RFID tag 140. When the position indicating device 100 receives the position request, the RFID reader 150 identifies the RFID tag 190 near the position indicating device 100, and transfers the information corresponding to the RFID tag 190 back to the position requesting device 200. For example, the RFID device 150 identifies the fixed-type RFID tag 190 near the position indicating device 150 and detects an RFID tag 190 of a retail location. The position indicating device 200 can then easily trace the position of the RFID tag 190, which also corresponds to the current position of the position indicating device 100.

Furthermore, the selecting module 210 can select an appropriate module according to received signals. For example, the selecting module 210 can activate the inner WLAN module 120, GPS module 130, the RFID tag 140, and the RFID reader 150 to search the surrounding installations in the neighborhood in order to determine the current position of the position indicating device 100. If there is only an AP near the position indicating device 100 (that is, the surrounding installation only comprises the AP 170, and the satellites 160, RFID reader 180, and RFID tag 190 are far away from the position indicating device 100), the selecting module 210 will only select the WLAN module 120 to communicate with the AP 170 and will disable other modules to save power. In other situations, the selecting module 210 can simultaneously select a plurality of modules (for example, the selecting module 210 can simultaneously select the WLAN 120 and the RFID tag 140) to determine the current position of the position indicating device 100 more accurately and generate corresponding position information.

Please note that the present invention does not limit the number of references devices including the AP 170, the RFID reader 180, and the RFID tag. In this embodiment, a single AP 170, RFID reader 180, and RFID tag is merely utilized as a preferred embodiment, but this is not a limitation of the present invention. For example, taking the WLAN module 120 into consideration, because the effective distance of the WLAN module 120 is long, only one AP 170 may not be enough for accurately determining the position of the position indicating device 100. Therefore, multiple APs 170 can be utilized to accurately determine the position of the position indicating device 100. Furthermore, the selecting module 210 is an optional device. That is, the present invention position indicating device 100 can still be implemented without the selecting module 210, meaning the position indicating device 100 can directly receive the position request from the position requesting device 200 through each module without the selecting module, and receive signals from the surrounding installations in order to transfer back correct position information.

Figure 2:
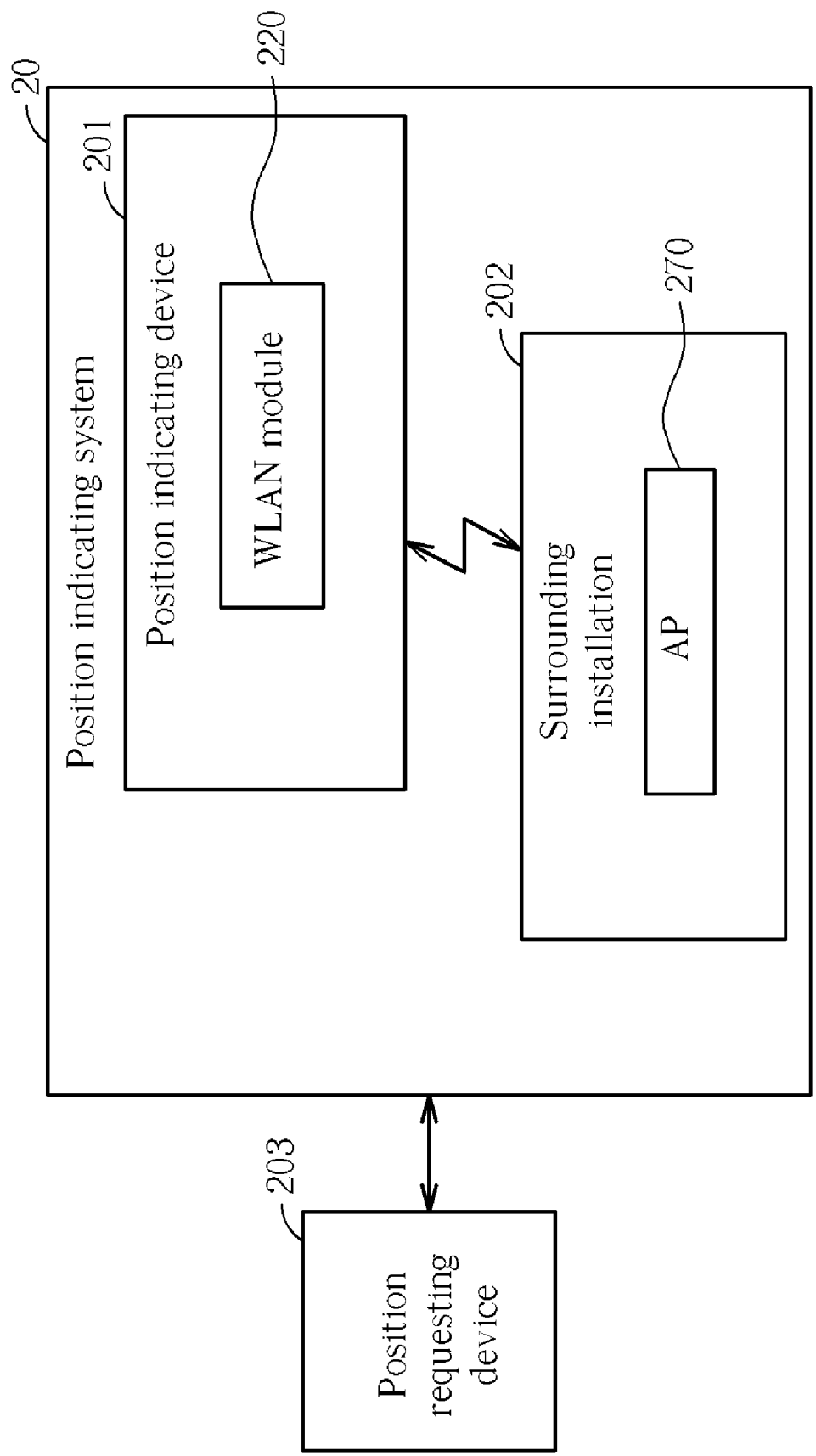
FIG. 2 is a diagram of a second embodiment of a position indicating system according to the present invention.

Please note that the above-mentioned position indicating modules, such as the WLAN module 120, GPS module 130, RFID tag 140, and RFID reader 150 and corresponding reference devices, AP 170, RFID reader 180, and RFID tag 190, can be designed selectively according to different product demands. Please refer to FIG. 2, which is a schematic diagram of a second embodiment of a position system 20 according to the present invention. As shown in FIG. 2, the position indicating system 20 comprises a position indicating device 201, and a surrounding installation 202. In this embodiment, the position indicating system 201 only comprises a WLAN module 220, and the surrounding installation only comprises an AP 270. In other words, the position indicating device 201 only utilizes the communication mechanism between the WLAN module 220 and the AP 270 to determine the current position of the position indicating device 201 and transmit corresponding information to the position requesting device 203.

Figure 3:
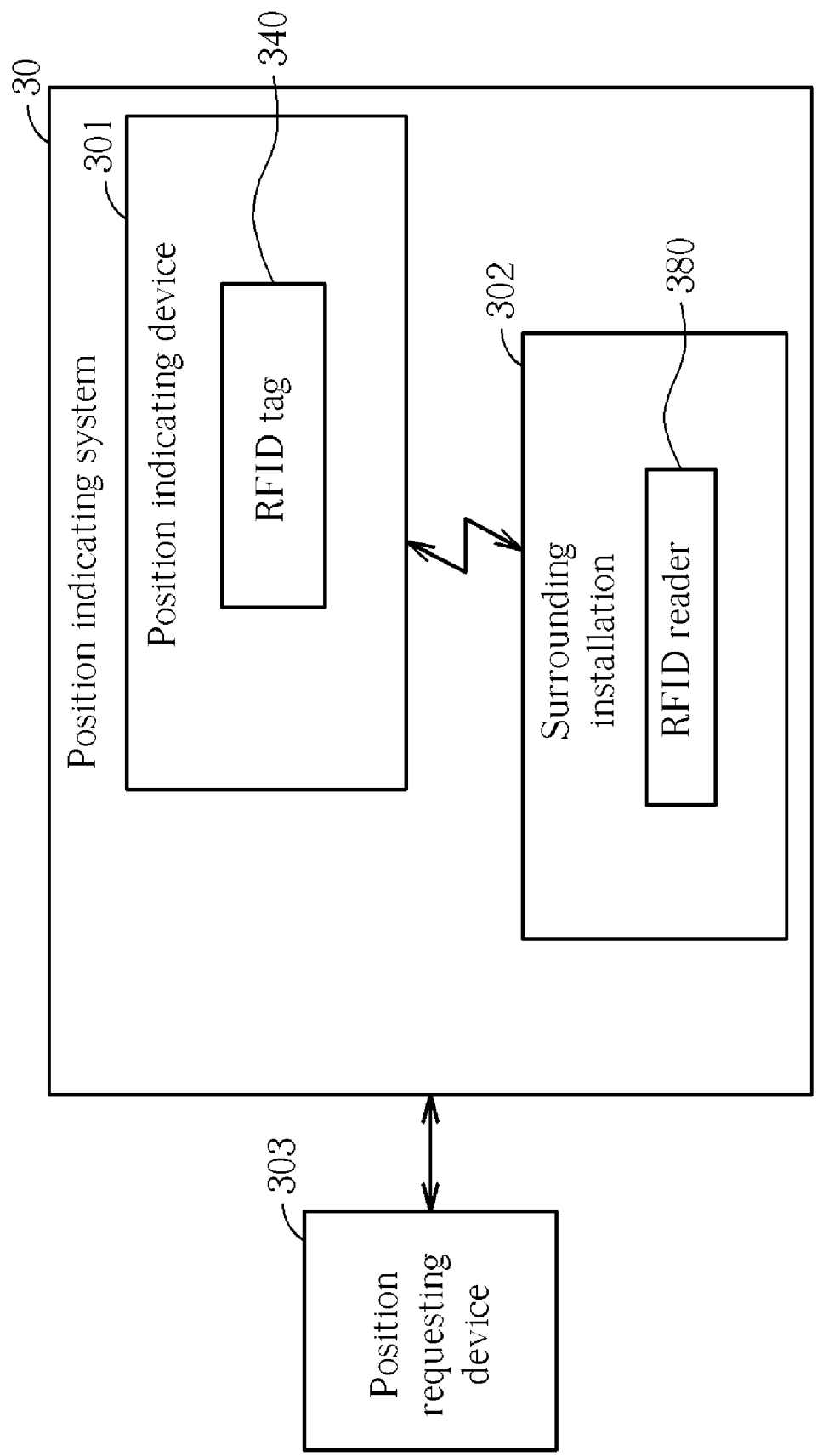
FIG. 3 is a diagram of a third embodiment of a position indicating system according to the present invention.

Please refer to FIG. 3, which is a diagram of a third embodiment of a position indicating system 30 according to the present invention. As shown in FIG. 3, the position indicating system 30 comprises a position indicating device 301, and a surrounding installation 302. In this embodiment, the position indicating device 301 only comprises an RFID tag 340, and the surrounding installation 302 only comprises an RFID reader 380. In other words, the position indicating device 301 only utilizes the communication mechanism between the RFID tag 340 and the RFID reader 380 to determine the current position of the position indicating device 301 and transmit corresponding information to the position requesting device 303.

Figure 4:
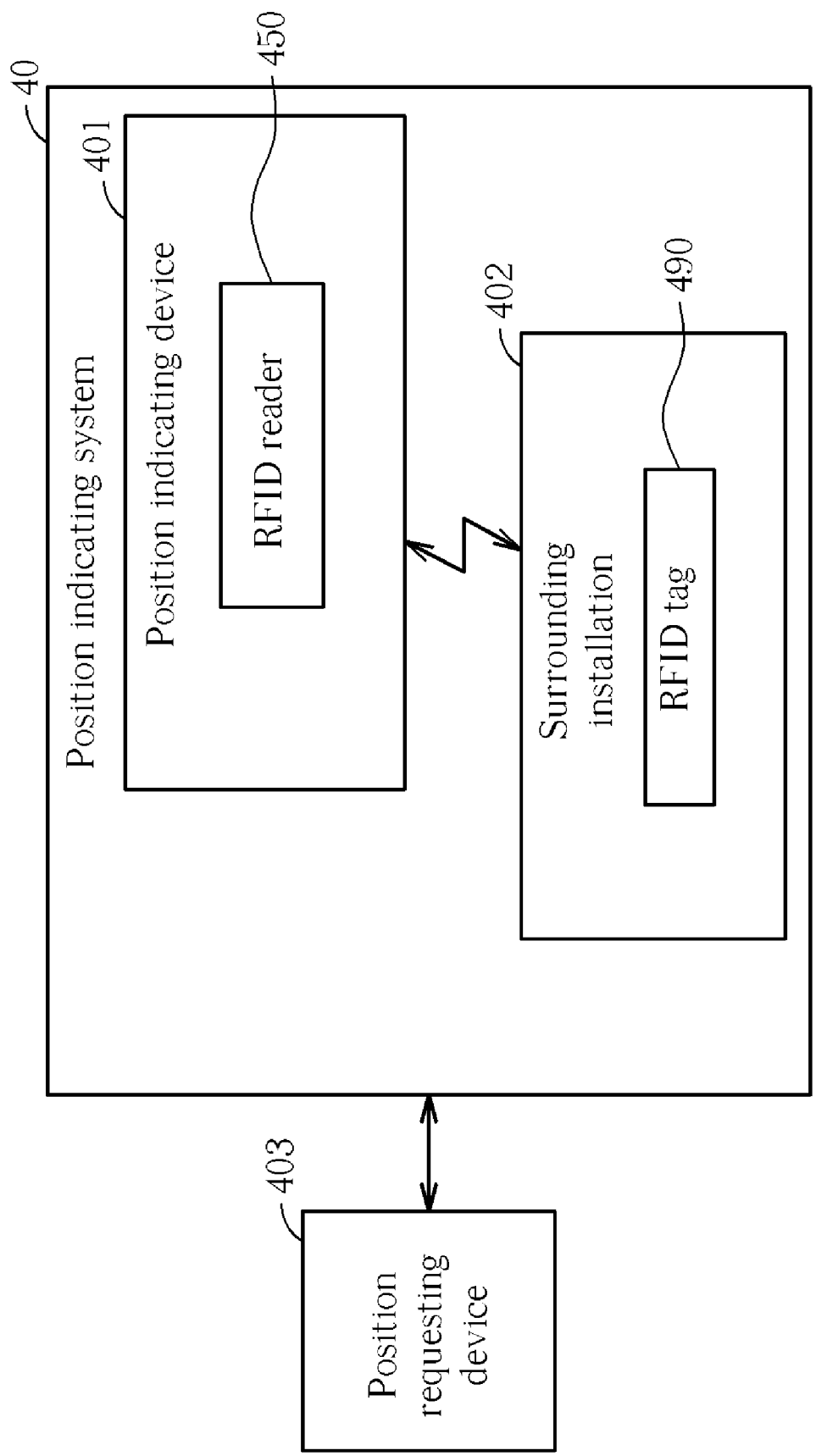
FIG. 4 is a diagram of a fourth embodiment of a position indicating system according to the present invention.

Please refer to FIG. 4, which is a diagram of a fourth embodiment of a position indicating system 40 according to the present invention. As shown in FIG. 4, the position indicating system 40 comprises a position indicating device 401, and a surrounding installation 402. In this embodiment, the position indicating device 401 only comprises an RFID reader 450, and the surrounding installation 402 only comprises an RFID tag 490. In other words, the position indicating device 401 only utilizes the communication mechanism between the RFID tag 490 and the RFID reader 450 to determine the current position of the position indicating device 401 and transmit corresponding information to the position requesting device 403.

The present invention position indicating device 100 can comprise a subclass of the above-mentioned devices (modules), and the surrounding installation 120 only has to comprise corresponding subclasses of the above-mentioned devices such that the present invention can achieve the goal of tracing the position. This also belongs to the field of the present invention.

Please note that the present invention indicating device 100 can be a passive device. That is, before the position indicating device 100 receives the position request, the position indicating device 100 can be in a standby or a sleep mode to save power. The position indicating device 110 can also be an active device to actively transfer signals to the surrounding installation 120 in order to transfer position information to the position requesting device 200. This also obeys the spirit of the present invention.

Please note that the present invention position indicating device 100 can be embedded in a cell phone, and the position requesting device 200 may comprise a communication device for outputting the above-mentioned position request, and a display device for displaying received position information. In an embodiment of the present invention, the position requesting device 200 can also be a cell phone. Therefore, the position information generated by the position indicating device 100 can be transferred to the position requesting device 200 through a well-known communication mechanism (for example, a cell phone message or an e-mail) of the cell phone. This also obeys the spirit of the present invention.

In contrast to the prior art, the present invention can accurately determine the current position of the position indicating device and generate position information to an external position requesting device. Therefore, a first user only has to carry the position indicating device, and another user who has the position requesting device can know the current position of the first user, effectively solving the missing persons problem. In addition, the present invention position indicating system can simultaneously utilize the wireless network, GPS, and RFID techniques to determine the position of the position indicating device. Therefore, the present invention position indicating system can be utilized in any location to accurately determine the position of the position indicating device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A position indicating system comprising:
   a position requesting device for outputting a position request;
   a position indicating device comprising:
      a first position indicating module for outputting a first signal, wherein the first position indicating module is activated after the position indicating device receives the position request;
      a second position indicating module for outputting a second signal, wherein the second position indicating module is activated after the position indicating device receives the position request; and
      a selecting module electrically connected to a wireless local area network (WLAN) module, the first position indicating module, and the second position indicating module for selectively driving the first position indicating module to output the first signal or driving the second position indicating module to output the second signal;
   a first reference device corresponding to the first position indicating module for receiving the first signal and generating first position information according to a position of the position indicating device; and
   a second reference device corresponding to the second position indicating module for receiving the second signal and generating second position information according to a position of the position indicating device.

2. The position indicating system of claim 1 wherein the first position indicating module comprises a global positioning system (GPS) module.

3. The position indicating system of claim 1 wherein the first position indicating module comprises a wireless local area network (WLAN) module and the first reference device comprises an access point (AP).

4. The position indicating system of claim 1 wherein the first position indicating module comprises a radio frequency identification (RFID) tag and the first reference device comprises a plurality of RFID readers.

5. The position indicating system of claim 1 wherein the second position indicating module comprises a wireless local area network (WLAN) module and the second reference device comprises an access point (AP).

6. The position indicating system of claim 1 wherein the second position indicating module comprises an RFID tag and the second reference device comprises a plurality of RFID readers.

7. The position indicating system of claim 1 further comprising a third reference device for generating a third signal, wherein the position indicating device further comprises a third position indicating module corresponding to the third reference device for receiving the third signal and generating third position information corresponding to the position indicating device.

8. The position indicating system of claim 7 wherein the selecting module is electrically connected to the third position indicating module and capable of selectively driving the third position indicating module to receive the third signal.

9. The position indicating system of claim 7 wherein the third reference device comprising a plurality of RFID tags and the third position indicating module comprises a RFID reader.

10. The position indicating system of claim 1 further comprising a fourth reference device for receiving a fourth signal and generating fourth position information of the position indicating device, wherein the position indicating device further comprises a fourth position indicating module corresponding to the fourth reference device for outputting the fourth signal.

11. The position indicating system of claim 10 wherein the selecting module electrically connected to the fourth position indicating module and capable of selectively driving the fourth position indicating module to output the fourth signal.

12. The position indicating system of claim 8 wherein the fourth position indicating module comprises a global positioning system (GPS) module, a wireless local area network (WLAN) module, or a radio frequency identification (RFID) tag.

13. A position indicating system comprising:
- a position requesting device for outputting a position request;
- a position indicating device comprising:
  - a first position indicating module for outputting a first signal, wherein the first position indicating module is activated after the position indicating device receives the position request;
  - a second position indicating module for outputting a second signal and generating second position information corresponding to a position of the position indicating device according to the second signal, wherein the second position indicating module is activated after the position indicating device receives the requesting signal; and
  - a selecting module electrically connected to the first position indicating module and the second position indicating module for selectively driving the first position indicating module to output the first signal or driving the second position indicating module to output the second signal;
- a first reference device corresponding to the first position indicating module for receiving the first signal and generating first position information according to a position of the position indicating device according to the first signal; and
- a second reference device corresponding to the second position indicating module for outputting the second signal.

14. The position indicating system of claim 13 wherein the first position indicating module comprises a global positioning system (GPS) module.

15. The position indicating system of claim 13 wherein the first position indicating module comprises a wireless local area network (WLAN) module and the first reference device comprises an access point (AP).

16. The position indicating system of claim 13 wherein the first position indicating module comprises a radio frequency identification (RFID) tag and the first reference device comprises a plurality of RFID readers.

17. The position indicating system of claim 13 wherein the second position indicating module comprises an RFID reader and the second reference device comprising a plurality of RFID tags.

* * * * *